Jan. 28, 1969  G. HOY  3,424,489
LOAD TRANSPORTING VEHICLES
Filed Oct. 6, 1966
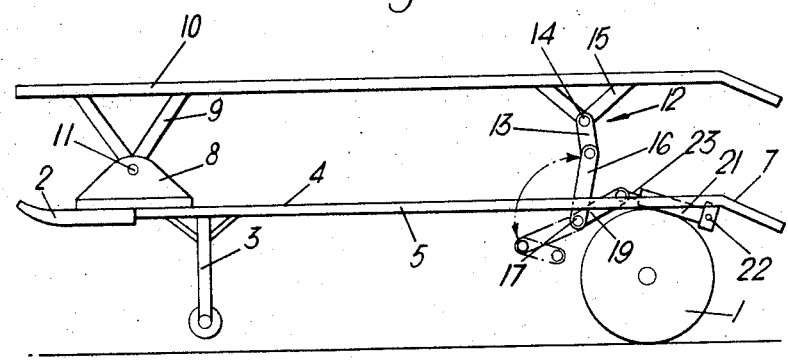
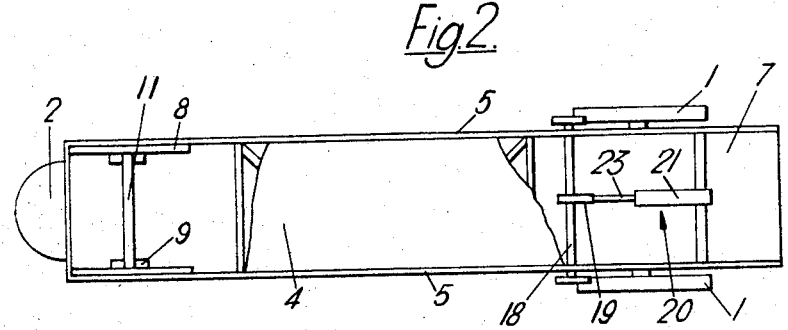
Inventor
GORDON HOY
By 3,424,489
LOAD TRANSPORTING VEHICLES
Gordon Hoy, Chelmsford, England, assignor to Hoynor Limited, Danbury, England, a corporation of Great Britain
Filed Oct. 6, 1966, Ser. No. 584,908
U.S. Cl. 296—1   5 Claims
Int. Cl. B60p *3/08, 1/28*

ABSTRACT OF THE DISCLOSURE

The upper deck of a double deck transport vehicle is pivoted at its front end to the lower deck and is connected at its rear end to the lower deck through power operated toggle linkage so that the rear of the upper deck may be lowered to a position in which it may be loaded in a fashion similar to and as easily as the lower deck is loaded, and when raised provide clearance for loading the lower deck.

Background of the invention

In double deck transport vehicles there are upper and lower decks each of which is loaded with vehicles such as cars one behind the other. The lower deck forms the chassis of the vehicle and usually has a ramp disposable to enable the cars to be driven up the ramp onto the lower deck. A higher ramp may be provided to load the cars onto the upper deck, or a lift may be provided to raise cars from the lower deck level to the upper deck level. The loading of such transporting vehicles and particularly the upper deck is a time consuming operation and a number of operatives are employed, as well as requiring the provision of loading ramps or lifting means for the upper deck. Moreover the lower deck must be above the road wheels of the transporting vehicle which increases the overall height of the fully loaded vehicle which may not be tolerable in view of bridges under which the loaded vehicles may have to be taken.

The main object of the present invention is to provide a transporting vehicle in which the aforesaid disadvantages are minimised.

Summary of the invention

According to the present invention a double deck transporting vehicle comprises a lower deck chassis having a pair of road wheels at its rear portion and means towards its forward end for supporting the front end of the chassis, an upper deck platform pivotally mounted at its front end portion with respect to the front end portion of the chassis, a linkage pivotally connecting the rear portions of the chassis and platform, at least one link being supported on a pivot on the chassis and rigid with an arm, and power operated means operable to rotate said arm about the axis of rotation of said chassis link pivot to activate said linkage to pivot the platform at its front portion with respect to the chassis for loading and unloading the platform over its lowered rear end.

Preferably the chassis is a trailer chassis and the means to support the front end thereof comprises a coupling, e.g. a fifth wheel coupling plate, for supporting the trailer front end portion on towing device, e.g. fifth wheel coupling on the rear end of a tractor vehicle.

The linkage preferably comprises a first link pivoted at one end to the platform and a second link pivoted at one end to a shaft pivotally mounted with respect to and transversely of the chassis, the free ends of said links being pivotally interconnected, said links being disposed so as not to foul the rear road wheels.

The linkage arm is preferably disposed beneath or to one side of the chassis and the power operated means comprises a fluid activated ram with piston and cylinder elements, one element being pivoted to the free end of the arm and the other element being pivoted to the chassis about a transverse axis.

In order that the invention may be more fully understood an embodiment in accordance therewith will now be described by way of example with reference to the accompanying drawings in which:

FIG. 1 is a diagrammatic side elevation of a vehicle; and

FIG. 2 is a plan view of the lower deck of the vehicle in FIG. 1.

Referring to the drawings the vehicle is shown as a trailer having rear road wheels 1 and the fifth wheel plate 2 at the front end for detachably connecting to the fifth wheel device of conventional construction on a tractor or like towing vehicle; the front end of the vehicle may however be supported on front wheels similar to the rear wheels and then the vehicle is towed through a conventional tow bar by a towing vehicle. Alternatively the front end of the vehicle may have conventional driving means by which the vehicle is self-propelled. In the case of a trailer-type vehicle, the conventional suport with castors 3 is usually provided.

The lower deck 4 of the vehicle forms part of the vehicle chassis having longitudinal frame members 5 with spaced transverse members or other suitable construction; the deck surface may be plates fixed to the frame members and may extend right over the whole frame or be formed as two longitudinal tracks end to end of the chassis disposed so that a saloon car can be moved along and supported on them. The whole may be secured together by bolts, rivets, welding or all these unions. The rear of the chassis has an inclined portion 7 to which ramp members may be fixed to form a track up which cars or like loads can be moved onto the deck 4. The ramp members may be hinged to the rear of the portion 7 and folded thereon for transit and hinged down to engage the ground for loading.

The front end portion of the chassis has side brackets 8 to which is pivoted a frame 9 supporting the front portion of the upper deck 10. The hinge 11 preferably comprises, as shown, a shaft extending across the vehicle between the brackets, but individual pivots may be provided on each bracket.

The rear end portion of the upper deck 10 is supported on the rear of the vehicle by a linkage 12 to be described. The linkage 12 comprises an upper link 13 pivoted at 14 at its upper end to the deck 10, as by a bracket 15 secured thereto, and at its free end pivoted to a second link 16 the lower end of which is pivoted at 17 to the chassis; the pivot at 17 preferably comprises as shown a tube 18 extending across the chassis and at its end portions journalled in the chassis or on brackets secured to the chassis; the link 16 is fast with the tube 18 to swing in a vertical plane when the tube rotates. Also fixed to the tube 18 is an arm 19 disposed to swing in a vertical plane when the tube rotates. Power operated means 20 is mounted in the chassis and is connected to the free end of the arm 19 so that as the means 20 is operated the arm is swung to rotate the tube to swing the link 16 and cause the links 13, 16 to occupy the lowered position shown in dotted lines in FIG. 1, thereby pivoting the upper deck about th pivot H so that when ramp members similar to those of this lower deck are positioned against the rear end of the deck 10, cars or other loads can be loaded onto the upper deck. By reverse operating the power means the loaded upper deck can then be raised into the travelling position shown in FIG. 1.

The power means 20 may be, as shown, a fluid operated ram having a cylinder element 21 hinged at 22 to the chassis while a rod 23 connected to the piston element (sliding in the cylinder and not shown) is pivoted to the free end of the arm 19. The cylinder is preferably hydraulically operated with oil but compressed air may be used. The oil, when used, is forced into the cylinder by a hand pump or by an electrically driven pump energised from the tractor vehicle; any other suitable prime mover may be used, for example an electric motor through a reduction gear, e.g. a 12 volt electric motor and a 200/1 reduction gear.

The whole chassis and platform may be made of any suitable materials, but steel I or [ sections are preferred, although they may for example be of aluminum.

By means of the aforesaid linkage, the power operated lifting means jacks up the upper deck, and with a hydraulic ram, the upper deck can be gently lowered by operating the release valve of the ram. The linkage and the ram are not used to support the raised upper deck, as a prop of any suitable construction may be inserted between the two decks to support the raised upper deck.

One linkage may be provided but it is preferable to have a linkage at each side of the vehicle which may be outside the frame members 5 and are disposed not to foul the frame of the wheels 1. The power operated means may also be duplicated one at each side of the vehicle if desired. The power operated means is preferably beneath the chassis, but if the arm rises above the lower deck as shown it is preferably at one side of the chassis so as not to interfere with any load thereon.

It will be seen that by the simple pivoting of the upper deck, the whole vehicle is made a light structure of simple construction capable of simple and easy operation.

What I claim is:

1. A double deck load transporting vehicle comprising a lower deck chassis having a pair of road wheels at its rear portion and means towards its forward end for supporting the front end of the chassis, an upper deck platform pivotally mounted at its front end portion with respect to the front end portion of the chassis for movement between an operative substantially horizontal position overlying said chassis and an inclined lowered position, a toggle linkage pivotally connecting the rear portions of the chassis and platform, one link of said linkage being supported on a pivot on the chassis and rigid with a rotatable arm, and power operated means operable to rotate said arm about the axis of rotation of said chassis link pivot to activate said linkage to pivot substantially the whole of said platform at its front portion with respect to the chassis for loading and unloading the inclined platform over its lowered rear end.

2. A vehicle according to claim 1 wherein the chassis is a trailer chassis and the means to support the front end thereof comprises a coupling, e.g. a fifth wheel coupling plate, for supporting the trailer front end portion on a towing device, e.g. fifth wheel coupling on the rear end of a trailer vehicle.

3. A vehicle according to claim 1 wherein the linkage comprises a first link pivoted at one end to the platform and a second link pivoted at one end to a shaft pivotally mounted with respect to and transversely of the chassis, the free ends of said links being pivotally interconnected, said links being disposed so as not to foul the rear road wheels.

4. A vehicle according to claim 1 wherein the linkage arm is disposed beneath or to one side of the chassis and the power operated means comprises a fluid activated ram with piston and cylinder elements, one element being pivoted to the free end of the arm and the other element being pivoted to the chassis about a transverse axis.

5. A vehicle according to claim 4 wherein oil is forced into the cylinder element of the arm by an electrically driven pump energised from the tractor vehicle.

References Cited

UNITED STATES PATENTS

| | | | |
|---|---|---|---|
| 2,694,597 | 11/1954 | Kunz | 296—1 |
| 2,883,231 | 4/1959 | Dawson | 296—1 |
| 3,145,043 | 8/1964 | Gyori | 296—1 |

PHILIP GOODMAN, *Primary Examiner.*

U.S. Cl. X.R.
214—512; 105—368